(12) United States Patent
Lee et al.

(10) Patent No.: US 10,187,349 B2
(45) Date of Patent: Jan. 22, 2019

(54) METHOD AND DEVICE FOR SELECTING SOURCE IP ADDRESS

(71) Applicant: Samsung Electronics Co., Ltd., Suwon-si, Gyeonggi-do (KR)

(72) Inventors: Jin-Sung Lee, Seoul (KR); Ki-Suk Kweon, Suwon-si (KR); Jung-Shin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 72 days.

(21) Appl. No.: 15/029,146

(22) PCT Filed: Oct. 13, 2014

(86) PCT No.: PCT/KR2014/009578
§ 371 (c)(1),
(2) Date: Apr. 13, 2016

(87) PCT Pub. No.: WO2015/056940
PCT Pub. Date: Apr. 23, 2015

(65) Prior Publication Data
US 2016/0269355 A1 Sep. 15, 2016

(30) Foreign Application Priority Data
Oct. 14, 2013 (KR) ........................ 10-2013-0122115

(51) Int. Cl.
H04L 29/12 (2006.01)
H04L 12/721 (2013.01)
H04W 8/26 (2009.01)
(Continued)

(52) U.S. Cl.
CPC .......... *H04L 61/2007* (2013.01); *H04L 45/72* (2013.01); *H04W 8/26* (2013.01); *H04W 84/12* (2013.01); *H04W 88/02* (2013.01)

(58) Field of Classification Search
CPC ...... H04L 61/2007; H04L 45/72; H04W 8/26; H04W 88/02
See application file for complete search history.

(56) References Cited

U.S. PATENT DOCUMENTS

2006/0056420 A1 3/2006 Okuda et al.
2007/0030855 A1 2/2007 Ribiere et al.
(Continued)

FOREIGN PATENT DOCUMENTS

KR 10-2006-0119686 A 11/2006

OTHER PUBLICATIONS

Written Opinion of the International Searching Authority, dated Sep. 1, 2015, pp. 1-12. [online], [retrieved on Aug. 15, 2017]. Retrieved from the Patentscope Database of the World Intellectual Property Office using Internet: <URL: https://patentscope.wipo.int/search/docservicepdf_pct/id00000033061191/ETWOS/WO2015056940.pdf>.*

(Continued)

Primary Examiner — Omar J Ghowrwal
(74) Attorney, Agent, or Firm — Jefferson IP Law, LLP

(57) ABSTRACT

The present invention relates to a method and device for setting a selective source IP address. The method for setting a source IP address of a terminal comprises the steps of: receiving an allocation of a plurality of IP addresses from at least one network node; acquiring information on the property of at least one IP address among the plurality of IP addresses; and selecting the source IP address for a flow of the terminal from the plurality of IP addresses on the basis of attribute information of at least one IP address, wherein the attribute information of the IP address can include information on a flow for recommending the use of a corresponding IP address and/or information on a flow for prohibiting the use of the corresponding IP address.

19 Claims, 10 Drawing Sheets

(51) Int. Cl.
  *H04W 88/02* (2009.01)
  *H04W 84/12* (2009.01)

(56) References Cited

U.S. PATENT DOCUMENTS

| | | | |
|---|---|---|---|
| 2007/0110058 A1* | 5/2007 | Park | H04L 29/12283 370/389 |
| 2007/0297378 A1 | 12/2007 | Poyhonen et al. | |
| 2008/0101315 A1 | 5/2008 | Bachmutsky | |
| 2008/0192681 A1 | 8/2008 | Lee et al. | |
| 2012/0258674 A1 | 10/2012 | Livet et al. | |
| 2015/0296450 A1* | 10/2015 | Koo | H04W 48/16 455/435.3 |

OTHER PUBLICATIONS

Thaler et al., Default Address Selection for Internet Protocol Version 6 (IPv6), Internet Engineering Task Force (IETF), Sep. 2012, pp. 1-32, RFC 6724.

Tsirtsis et al., Traffic Selections for Flow Bindings, Internet Engineering Task Force (IETF), Jan. 2011, pp. 1-13, RFC 6088.

Bernados et al., PMIPv6-based distributed anchoring draft-bernados-dmm-distributed-anchoring-01, DMM Working Group, Sep. 21, 2012, pp. 1-24.

Yoo, Network Architecture for LTE and Wi-Fi Interworking, Netmanias Technical Document: Network Architecture for LTE and Wi-Fi Interworking, Aug. 16, 2012, Netmanias.com, nmcgroups.com.

NMC Consulting Group, LTE Identification III: EPS Session/Bearer Identifiers, Netmanias Technical Document: LTE Identification III: EPS Session/Bearer Identifiers, Aug. 26, 2013, netmanias.com, nmcgroups.com.

3rd Generation Partnership Project; Technical Specification Group Services and System Aspects; Local IP Access and Selected IP Traffic Offload (LIPA-SIPTO) (Release 10), 3GPP TR 23.829 V10.0.1 (Oct. 2011).

* cited by examiner

METHOD AND DEVICE FOR SELECTING SOURCE IP ADDRESS

CROSS-REFERENCE TO RELATED APPLICATION(S)

This application is a U.S. National Stage application under 35 U.S.C. § 371 of an International application filed Oct. 13, 2014, and assigned application number PCT/KR2014/009578, which claimed the benefit of a Korean patent application filed on Oct. 14, 2013, in the Korean Intellectual Property Office and assigned Serial number 10-2013-0122115, the entire disclosure of which is hereby incorporated by reference.

BACKGROUND ART

The present invention relates to a method and device for selecting an IP address of a UE.

In general, a User Equipment (UE) receives an allocation of an IP address for a wireless communication interface from a network (for example, a cellular network such as Long Term Evolution (LTE) or a wireless local area communication network (Wireless LAN)) and performs communication using the allocated IP address. For example, the UE may receive an allocation of IP addresses from a gateway of the cellular network and/or Access Point (AP) of the WLAN and perform a service requested by the user using the allocated IP address.

Recently, when the plurality of IP addresses are allocated to the UE, a scheme for selecting an effective IP address among the allocated plurality of IP addresses has been studied. For example, since the size of an area managed by a corresponding network node may be different and a path for connecting each service may be different for each IP address, a scheme has been studied for selecting, by the UE, an IP address which can provide a service requested by the user in a stable manner without discontinuation. For example, in 3GPP release 10, when IP addresses are allocated from different network nodes such that a network node (for example, a gateway) located closest to the location of the UE is selected and an allocation of a new IP address is received from the network node so as to perform the communication with an external network (for example, the Internet), a Selective IP Traffic Offload (SIPTO) technique is provided such that IP addresses allocated from the network node located closest to the location of the UE are selected to enable the UE to perform the communication with the external network (for example, the Internet) through a network node (for example, the gateway) located closest to an access network. For another example, for a UE supporting both a cellular network and a WLAN, a technique has been provided which allows the communication using an IP address allocated from an AP of the WLAN after cutting off the communication with the cellular network when the UE is connected to the WLAN. However, the conventional gateway/network selection techniques may cause a change in the IP address so that it is difficult to guarantee the continuity of the service or performance experienced by the user for the service used by the UE.

DISCLOSURE

Technical Problem

Therefore, there is a need to provide an IP address selection scheme which can guarantee the service continuity and/or service quality of the UE.

An embodiment of the present invention is to provide a method and device for selecting a source IP address based on the operator policy for each IP address when a plurality of IP addresses are allocated to wireless communication interfaces of a UE.

Another embodiment of the present invention is to provide a method and device for selecting a source IP address based on a user's preference when a plurality of IP addresses are allocated to wireless communication interfaces of a UE.

Still another embodiment of the present invention is to provide a method and device for selecting a source IP address based on the characteristics of an application executed on a UE when a plurality of IP addresses are allocated to wireless communication interfaces of the UE.

According to an embodiment of the present invention, there is provided a method for setting a source IP address by a UE. The method may comprise: receiving an allocation of a plurality of IP addresses by at least one network node; acquiring attribute information on at least one IP address among the plurality of IP addresses; and selecting a source IP address for a flow of the UE from the plurality of IP addresses on the basis of the attribute information on at least one IP address, wherein the attribute information on the IP address may include information on a flow for recommending the use of a corresponding IP address and information on a flow for prohibiting the use of a corresponding IP address.

According to an embodiment of the present invention, there is provided a method for allocating an IP address by a network node. The method may comprise: generating attribute information on an IP address allocated to a UE, and transmitting the attribute information on the IP address to the UE, wherein the attribute information on the IP address comprises at least one of information on a flow for recommending the use of a corresponding IP address and information on a flow for prohibiting the use of a corresponding IP address.

According to an embodiment of the present invention, there is provided a UE device for setting a source IP address. The UE device may comprise an IP address selection unit configured to receive an allocation of a plurality of IP addresses by at least one network node, acquire attribute information on at least one IP address among the plurality of IP addresses, and select a source IP address for a flow of the UE from the plurality of IP addresses on the basis of the attribute information of at least one IP address, wherein the attribute information on the IP address may include information on a flow for recommending the use of a corresponding IP address and information on a flow for prohibiting the use of a corresponding IP address.

According to an embodiment of the present invention, there is provided a network node device for allocating an IP address. The network node device may comprise an IP attribute generation unit configured to generate attribute information on an IP address allocated to a UE, and transmit the attribute information on the IP address to the UE, wherein the attribute information on the IP address comprises at least one of information on a flow for recommending the use of a corresponding IP address and information on a flow for prohibiting the use of a corresponding IP address.

According to an embodiment of the present invention, there is provided a method for managing an IP address by a network node. The method may comprise: detecting allocation, to a UE, of a plurality of IP addresses by at least one network node; when detecting the allocation of a plurality of IP addresses to the UE, requesting the at least one network node to provide the attribute information on at least one IP address; and receiving the attribute information on the at least one IP address from the at least one network node so as to transfer the same to the UE, wherein the attribute information on the IP address comprises at least one of information on a flow for recommending the use of an IP address and information on a flow for prohibiting the use of an IP address

BEST MODE

Figure 1:
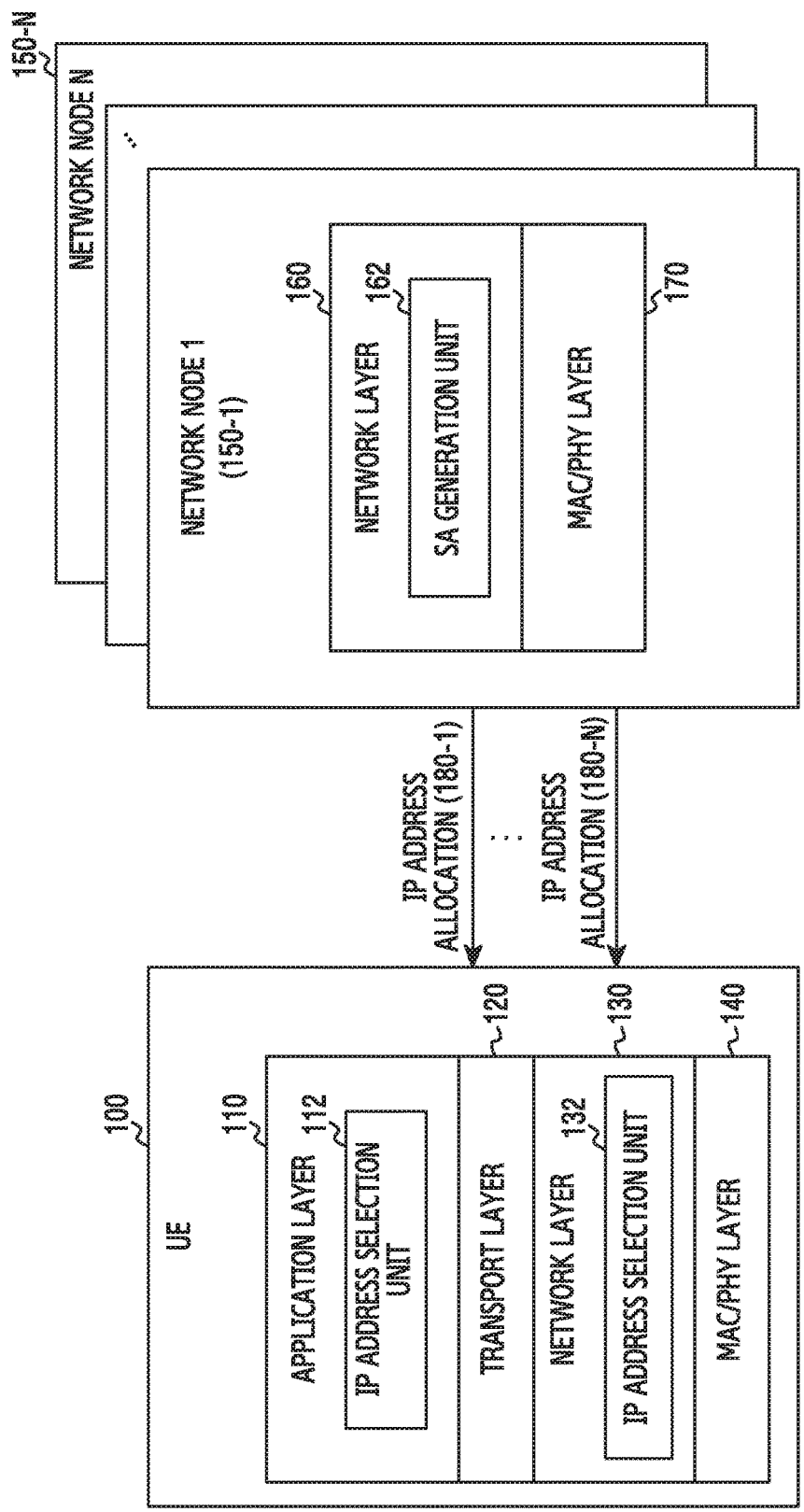
FIG. 1 is a diagram showing a configuration of a UE and a network node according to an embodiment of the present invention.

Hereinafter, various embodiments of the present invention will be described with reference to the accompanying drawings. Then, in the following description of various embodiments of the present disclosure, when it is determined that detailed descriptions related to well-known functions or configurations may unnecessarily obscure the subject matter, a detailed description thereof will be omitted. In addition, terms to be described later are defined by considering functions in various embodiments of the present invention, and the meanings of the terms may vary depending on the user and operator's intention or usual practice. Therefore, definitions should be made on the basis of the overall context of the specification.

In this document, terms such as "have," "may have," "include," "may include", or the like refer to the presence of the corresponding features (for example, numerical values, functions, actions, or elements such as parts, etc.) and it do not exclude the presence of additional features.

In this document, "A or B," "at least one of A and/or B," or "one or more of A and/or B" may include all possible combinations of the items listed altogether. For example, "A or B", "at least one of A and B," or "at least one of A or B" may refer to (1) include at least one A, (2) include at least one B, or (3) include both at least one of A and at least one B.

Terms such as "first," "second," and other numerical terms used in various embodiments may modify various elements regardless of the order and/or the importance, and may not limit corresponding elements. The terms may be used to distinguish one element from another. For example, a first user device and a second user device may represent user devices different from each other regardless of the order or importance. For example, a first element may be referred to as a second element, without departing the scope of claims of the present disclosure, and similarly, the second element may be referred to as the first element.

It should be understood that when an element (for example, first element) is referred to as being "operatively or communicatively coupled with/to" or "connected to" another element (for example, second element), it can be directly connected or coupled to the other element, or can be connected or coupled through another element (for example, third element). On the other hand, it can be understood that when an element (for example, first element) is referred to as being "directly connected," or "directly coupled" to another element (for example, second element), there is no other element (for example, third element) between the element and the other element.

The term "configured to ~" as used herein may refer to, according to the situation, for example, "suitable for ~, "having the capacity to ~," "designed to," "adapted to ~," "made to ~," or "capable of ~". The term "configured to" may not necessarily mean that the hardware referred to as "specifically designed to". Instead, in some circumstances, terms such as "device configured to ~" may mean that the device may be "capable of ~" along with other devices or components. For example, the phrase "a processor configured to (or set to) perform A, B, and C" may refer to a dedicated processor (for example, an embedded processor) for performing the corresponding operation, or a generic-purpose processor (for example: CPU or an application processor) that may perform the corresponding operation by running one or more software programs stored in a memory device.

The terms used herein are for the purpose of describing particular embodiments only and are not intended to limit the scope of another embodiment. As used herein, the singular forms "a," "an," and "the" are intended to include the plural forms as well, unless the context clearly indicates otherwise. All terms used herein including technical and scientific terms may have the same meaning as that commonly understood by one of ordinary skill in the art of the present disclosure. Terms defined in a common dictionary may be construed to mean that they have the same or similar meaning with the context of the relevant art, and it is not to be excessively interpreted as having one ideal or excessively formal meaning unless clearly defined in this document. In some cases, although the terms are defined in this document, it should not be interpreted to exclude embodiments of the present disclosure.

An embodiment of the present invention will describe a method and device for selecting an IP address to be used for communication of the application from a plurality of IP addresses allocated to the wireless communication interface of the UE. For convenience of explanation, the following embodiments are described using an LTE network and a WLAN by way of example, but the embodiments of the present invention may also be applied to another type of network system which communicates using an IP address.

FIG. 1 is a diagram showing a configuration of a UE and a network node according to an embodiment of the present invention.

Referring to FIG. 1, a UE 100 may be allocated a plurality of IP addresses from one or more network nodes 150-1 to 150-N. For example, the UE 100 may be allocated at least one IP address from a network node 1 150-1, and allocated a plurality of IP addresses 180-1 . . . 180-N from a network node N 150-N. The UE 100 may select an IP address which will be used for communication for an application to be executed, from the plurality of IP addresses allocated from the one or more network nodes 150-1 to 150-N. According to an embodiment of the present invention, when IP addresses are allocated from the network nodes 150-1 to 150-N, the UE 100 may receive an IP address selection attribute information indicating a service policy with respect to the selection of an IP, and select IP addresses to be used for the communication for applications from the plurality of IP addresses, by using the IP address selection attribute information. In addition, the UE 100 may select an IP address by considering at least one of the user preference information and characteristics information of the applications.

The IP address selection attribute information according to an embodiment of the present invention may include preference information, prohibition information, coverage information, and expiration information.

First, the preference information may be information indicating a feature of an IP flow for selecting the corresponding IP address as the source address, and the prohibition information may be information indicating a feature of an IP flow that does not select the corresponding IP address as the source address. The features of the IP flows included in the preference information and the prohibition information may be configured to at least one parameter among parameters such as a destination IP address and a subnet (for example, 1.2.3.4 or 1.2.0.0/16), a destination domain name (for example, *.samsung.net or galaxy.samsung.net), a destination port number and a destination port number range (for example, 1234 or 1234-1299), a source port number and a source port number range (for example, 5678 or 5678-5699), and a transport layer protocol (for example, TCP, SCTP, or UDP), and may also be configured to combine two or more parameters among the above-mentioned parameters. In addition, the features of the IP flows may be represented by requirements associated with the mobility of the UE, such as IP flow continuity or IP address reachability. Here, the IP flow continuity means, even when the UE moves and is connected to the IP network using a different subnet, that the service started by using an IP address allocated from the conventional IP network is continuously provided without interruption so as to guarantee the continuity in another IP network, and the IP address reachability means that, regardless of the movement of the UE, an external network is always able to know the latest IP address allocated to the UE in order to connect a new session (for example, TCP) from the external network to the UE. When the UE receives this requirement, it is assumed that the UE already knows an application that meets the requirements of the received UE. For example, a VoIP application such as Skype should be guaranteed IP flow continuity. In addition, when the features for a plurality of flows are included in the preference information and/or prohibition information on one IP address, the information may include a priority for each flow. At this time, the priority for each flow may mean the importance of the flow of the operator. Therefore, when it is difficult for the UE 100 to apply the plurality of IP address selection schemes proposed by the present invention to a plurality of flows, the IP address selection scheme proposed by the present invention can be preferentially applied to a flow having a high priority.

The coverage information may be information indicating a service coverage area of a network node (for example, an LTE gateway) allocated with the corresponding IP address. For example, the coverage information may indicate whether the gateway is a PGW that is responsible for a macro network or is an L-GW that is responsible for a local network. As another example, the coverage information represents the number of base stations that belong to the gateway, or may be numerical value information related to the geographical area on which the corresponding gateway is arranged. As another example, the coverage information may be information numerically indicating the size of the coverage area of the corresponding network node, or information indicating the level of the size of the corresponding network node.

The valid period information may indicate the remaining valid time of the corresponding IP address predicted based on the movement speed of the UE allocated with the corresponding IP address. That is, the valid period information is a time during which the UE is expected to stay within the coverage of the corresponding network node to which the corresponding IP address is allocated, and the corresponding network may calculate the time by receiving the movement speed from a node or a UE for managing the mobility of the UE.

For example, the IP address selection attribute information according to an embodiment of the present invention may be configured as shown in Table 1 below.

TABLE 1

| UE | IP address | Preference information | Prohibition information | Coverage information |
|---|---|---|---|---|
| UE A | 192.168.1.2 | DST: 123.456.789.3 | All flows except for preference information | L-GW |
| UE B | 192.168.1.3 | All flows except for prohibition information | DST: 123.456.789.0/24 | Valid time: 10 seconds |

As shown in Table 1, the UE A may be allocated an IP address "192.168.1.2" according to an embodiment of the invention. In this case, the UE A may check that an IP address "192.168.1.2" can be allocated to only the flow which has the destination address of "123.456.789.3" by analyzing the IP address selection attribute information on the corresponding IP address, and since the network node allocated by the corresponding IP address is an LGW, the UE A may recognize that the coverage area is relatively small compared to the PGW. In addition, the UE B may be allocated an IP address "192.168.1.3" in accordance with an embodiment of the invention. In this case, the UE B may check that an IP address "192.168.1.3" can be allocated to all flows except for the flow which has a destination address of "123.456.789.0/24" by analyzing the IP address selection attribute information on the corresponding IP address, and it can be predicted that the UE B is staying for 10 seconds in the coverage area of a network node by which the corresponding IP address is allocated, after which the UE B leaves the coverage area of the network node allocated the corresponding IP address.

A description will now be made on the configuration of the UE 100 for selecting an IP address in the above-described method. The UE 100 may be configured to include an application layer 110, a transport layer 120, a network layer 130, and a Media Access Control and Physical layer (MAC/PHY) 140.

The application layer 110 of the UE 100 may provide a service to the user, and convert the information or instructions input from the user to a predetermined message so as to transfer the message to the transport layer 120. The application layer 110 according to an embodiment of the present invention determines, through the IP address selection unit 112, a preferred IP address based on the user preference and/or application characteristics for an IP address or determines a non-preferred IP address, so as to select a candidate IP address from the plurality of IP addresses allocated to the UE 100. For example, the IP address selection unit 112 may receive, through the transport layer 120, information on a plurality of IP addresses allocated from one or more network nodes 150-1 to 150-N to the UE 100, provide information on the received plurality of IP addresses (for example, service area information of the gateway by which each IP address is allocated) to the user, receive a selection of a preferred IP address or non-preferred IP address from the user, and then select at least one candidate IP address based on the user's selection. That is, the IP address selection unit 112 may select an IP address that the user prefers among the allocated plurality of IP addresses as the candidate IP address, and select the remaining IP addresses with the exception of IP address that the user does not prefer, among the allocated plurality of IP addresses, as a candidate IP address. For another example, the IP address selection unit 112 may receive, through the transport layer 120, information on a plurality of IP addresses allocated from one or more network nodes 150-1 to 150-N to the UE 100, and may select a candidate IP address based on the characteristics on an application to be executed on the UE 100 (for example, average use time, last use time, the shortest time among the time that the user uses the application), the movement speed of the UE 100, and information on the received plurality of IP address (for example, service area information of the gateway by which each IP address is allocated). For example, when the average use time for the application to be executed is equal to or longer than a threshold time, the IP address selection unit 112 may select at least one IP address having a relatively large service area among the plurality of IP addresses as the candidate IP address. For another example, when the average use time for the application to be executed is equal to or longer than a threshold time and the movement speed of the UE 100 is equal to or faster than a threshold speed, the IP address selection unit 112 may select at least one IP address having a relatively large service area among the plurality of IP addresses as the candidate IP address. For another example, even when the average use time for the application to be executed is equal to or longer than a threshold time, but the movement speed of the UE 100 is slower than a threshold speed, the IP address selection unit 112 may select all of the plurality of IP addresses as the candidate IP address. For another example, the IP address selection unit 112 may predict a moving distance of the UE 100 with respect to the average use time for the application to be executed, and select the at least one candidate IP address based on the predicted moving distance. That is, as the time during which the application is expected to be executed is longer, the IP address selection unit 112 may select an IP address allocated from a network node having a large service area as the candidate IP address. In addition, the faster the movement speed of the UE 100, the IP address selection unit 112 may not prefer an IP address allocated from a network node having a small service area.

The application layer 110 provides the candidate IP address selected among the plurality of IP addresses allocated to the UE 100 to the network layer 130 through the transport layer 120.

The transport layer 120 is a layer associated with the TCP or UDP protocols and provides specifications for ensuring reliable data transmission between two systems. The transport layer 120 may receive a plurality of IP addresses allocated from the network layer 130 to the UE 100, transfer the IP addresses to the application layer 110, and transfer the candidate IP address selected from the application layer 110 to the network layer 130.

The network layer 130 performs a function of setting and routing the source IP address and destination IP address for a data packet for each application or for each flow, in order to transfer data to the destination. According to an embodiment of the present invention, as described above, the network layer 130 may acquire a plurality of IP addresses allocated from the at least one network node and IP address attribute information on each IP address. The network layer 130 determines, through the IP address selection unit 132, the source IP address based on the IP address selection attribute information on each of the plurality of IP addresses. For example, the IP address selection unit 132 of the network layer 130 receives the candidate IP address from the application layer 110, and determines a final IP address to be used as the source IP address of the data packet for the corresponding application based on the preference information and the prohibition information on each of the candidate IP addresses. More particularly, when receiving the candidate IP address from the application layer 110, the IP address selection unit 132 of the network layer 130 checks prohibition information on each of the candidate IP addresses and removes a candidate IP address which has prohibition information matched with the information on the flow for the application. For example, the IP address selection unit 132 may exclude, from the candidate IP address, an IP address having, as prohibition information, information that matches with at least one of the destination IP address and subnet, the destination domain name, the destination port number, the source port number, and the transport layer protocol of the flow for the corresponding application. The IP address selection unit 132 of the network layer 130 may exclude the candidate IP address having information that matches with the information on the flow as prohibition information, and then select, as the source IP address, a candidate IP address having information that matches with the information on the flow as preference information among the remaining candidate IP addresses. When a candidate IP address which has information matched with the information on the flow, as preference information, does not exist among the remaining candidate IP addresses, the source IP address among the remaining candidate IP addresses can be determined using a known source address selection technique (for example, a source address selection technique defined in IETF RFC 6274).

The Medium Access Control and Physical (MAC/PHY) layer 140 performs a function for communicating with the network node.

In the above, there has been described a method for selecting, by the application layer 110 of the UE 100, one or more candidate IP addresses among a plurality of IPs based on the user preference for the IP address and/or application characteristics, and then determining, by the network layer 130, the final IP address based on the preference information and prohibition information on the IP address among the one or more candidate IP addresses. However, according to an embodiment, the UE 100 may perform only a process for determining the IP address by the network layer 130 based on the preference information and prohibit information without performing the candidate IP selection process by the application layer 110.

Next, hereinafter, a description will be made on the configuration of the network node 150 for allocating an IP address to the UE 100. The network node 150 may be configured to include a network layer 160 and a MAC/PHY layer 170. The network node may be any network node which can allocate an IP address to the UE 100, and may be, for example, a PGW or LGW of an LTE system, or an AP or DHCP server of a WLAN.

The network layer 160 allocates an IP address to the UE 100 which requests the network connection. According to an embodiment of the present invention, the network layer 160 generates, through the selection attribute generation unit 162, IP address selection attribute information on the IP address to be allocated to the UE 100, and processes a function for transmitting the generated IP address selection attribute information to the UE 100. The preference information, prohibition information, and coverage information among IP address selection attribute information on each IP address are information indicating an operator policy, and may be predetermined by an operator of the network node 150 and updated as needed. In addition, the valid period information among the IP address selection attribute information on each IP address may be determined and updated according to the movement speed of the UE allocated the IP address. The network layer 160 may periodically collect information on the movement speed of the UE from the UE 100 or another network node so as to generate and update the valid period information, and when the valid period information on for an IP address of each UE is updated, the network layer 160 may transmit the updated information to the corresponding UE 100.

The Medium Access Control and Physical (MAC/PHY) layer 170 performs a function for communicating with the UE 100 or another network node.

Figure 2:
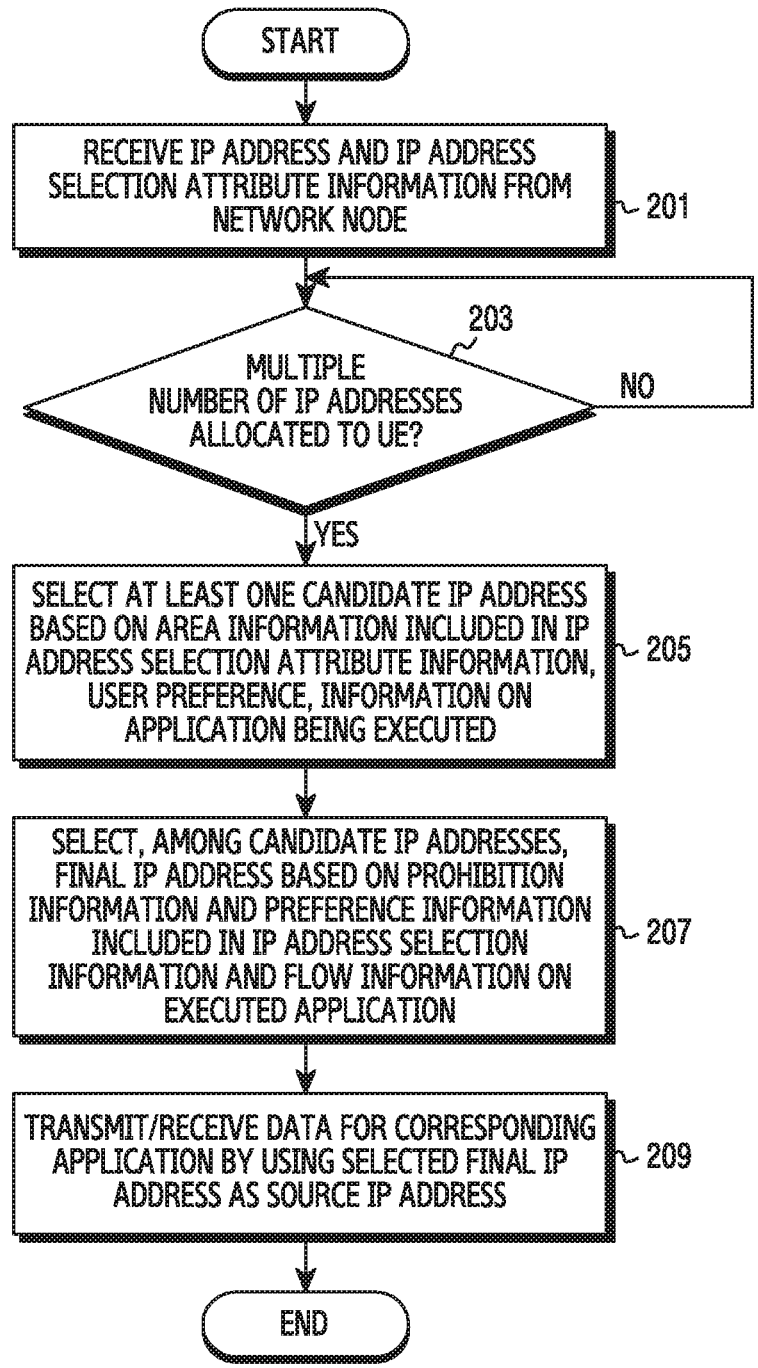
FIG. 2 is a diagram showing an IP address selection procedure by a UE according to an embodiment of the present invention.

FIG. 2 is a diagram showing an IP address selection procedure by a UE according to an embodiment of the present invention.

Referring to FIG. 2, the UE 100 receives IP addresses and IP address selection attribute information from the network node, in step 201. The IP address selection attribute information may indicate the operator policy associated with the selection of the corresponding IP address. The IP address selection attribute information may include preference information, prohibition information, coverage information, and valid period information.

The UE 100 checks whether a plurality of the IP addresses are allocated to the UE 100 in step 203. For example, the UE checks whether at least one IP address is additionally allocated through the step 201 in a state where a single IP address is allocated, or checks whether a plurality of IP addresses are allocated in step 201 in a state where an IP address is not allocated.

When a plurality of IP addresses are allocated to the UE 100, the UE 100 selects at least one IP address among the plurality of IO addresses based on at least one among the coverage information, user preference information, and characteristic information of an execution application included in the IP address selection attribute information, in step 203. For example, the UE 100 provides coverage information on the plurality of allocated IP addresses to a user, receives the selection of a preferred IP address or non-preferred IP address from the user, and then selects at least one candidate IP address based on the user's selection. For another example, the UE 100 may select a candidate IP address based on the characteristics (for example, an average use time) of an execution application and the coverage information on the allocated plurality of IP addresses. At this time, the UE 100 may predict that the application to be executed will be used by the average use time, and as the predicted use time is longer, the UE 100 may select, as a candidate IP address, an IP address allocated from a network node having a relatively large size service area from the allocated plurality of IP addresses. In addition, as the movement speed of the UE 100 is faster, the UE 100 may not prefer an IP address allocated from a network node having a small service area.

The UE 100 determines a final IP address to be used for the source IP address of the data packet for the corresponding application, among the candidate IP addresses, based on the preference information and the prohibition information on each candidate IP address, and flow information on an execution application, in step 207. For example, the UE 100 may check the prohibition information on each of the selected IP addresses, and remove a candidate IP address which has prohibition information matched with the information of the flow for the application. That is, the UE 100 may exclude, from the candidate IP addresses, an IP address having information, as prohibition information, that matches at least one of the destination IP address and subnet, the destination domain name, the destination port number, the source port number, and the transport layer protocol of the flow for the corresponding application. An IP address, as prohibition information, having information matched with at least one of the destination IP address The UE 100 may exclude the candidate IP address having information matched with the flow information, and then select, as the source IP address, a candidate IP address having information matched with the flow information, from the remaining candidate IP addresses. When a candidate IP address which has, as the preference information, information matched with the information on the flow does not exist among the remaining candidate IP addresses, the UE 100 may determine the source IP address among the remaining candidate IP addresses by using a known source address selection technique (for example, a source address selection technique defined in IETF RFC 6274).

Thereafter, the UE 100 transmits and receives data for the corresponding application by using the final IP address as the source IP address, in step 209.

Then, the UE 100 terminates the procedure according to an embodiment of the present invention.

Figure 3:
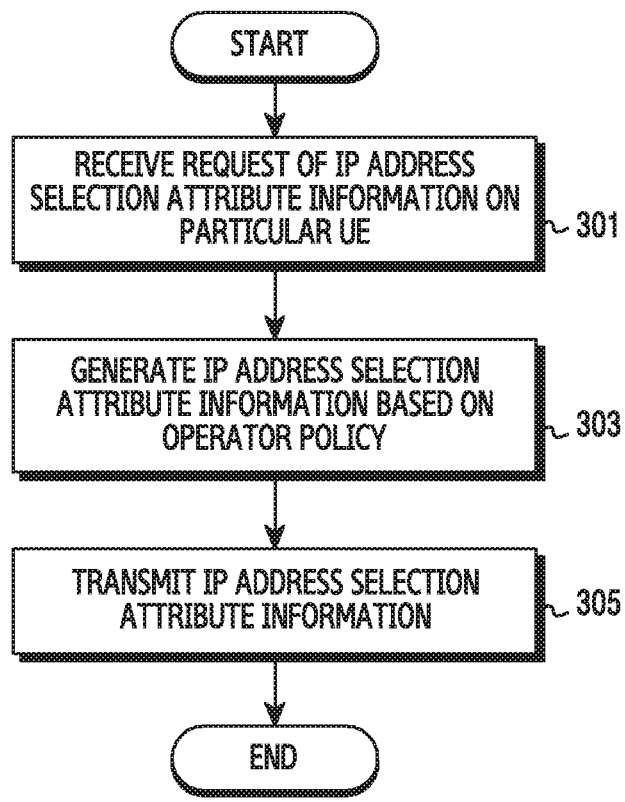
FIG. 3 is a diagram showing an IP address allocation procedure by a network node according to an embodiment of the present invention.

FIG. 3 is a diagram showing an IP address allocation procedure by a network node according to an embodiment of the present invention. Here, the network node may be a gateway (for example, PGW, LGW) of an LTE system.

Referring to FIG. 3, the network node receives a signal requesting the IP address selection attribute information on a particular UE, in step 301. For example, when the network node is a gateway, the network node may receive a request for providing the IP address selection attribute information on an IP address which will be allocated when receiving a session generation request message for a particular UE from a Mobile Management Entity (MME). As another example, the network node may directly receive, from a UE connected to the WLAN, a request for providing the IP address selection attribute information on the IP address previously allocated to the UE through the LTE.

The network node generates IP address selection attribute information based on an operator policy in step 303. For example, the network node generates IP address selection attribute information on an IP address to be allocated or a pre-allocated IP address for the corresponding UE. The preference information, prohibition information, and coverage information among IP address selection attribute information are information indicating the operator policy, and may be predetermined and updated by an operator of the network node. In addition, the valid period information among the IP address selection attribute information on each IP address may be determined according to the movement speed of the corresponding UE. The network node may collect information on the movement speed of the UE from the UE 100 or the MME so as to generate valid period information.

The network node transmits the IP address selection attribute information to the corresponding UE in step 305. For example, when the network node is a gateway, the network node may transmit both IP address selection attribute information and IP addresses which will be allocated to a particular UE when transmitting a session generation response message for a particular UE to a Mobile Management Entity (MME). As another example, the network node may transmit, to the UE connected to the WLAN, the IP address selection attribute information through the AP of the WLAN.

Thereafter, the network node terminates the procedure according to an embodiment of the present invention.

Figure 4:
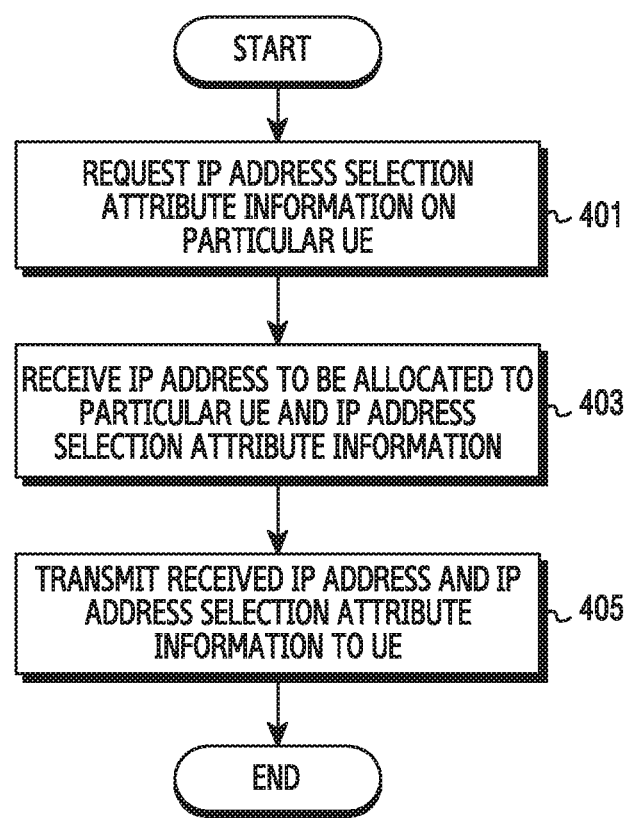
FIG. 4 is a diagram showing an IP address management procedure by a network node according to an embodiment of the present invention.

FIG. 4 illustrates an IP address management procedure of a network node according to an embodiment of the present invention. Here, the network node may be an MME of an LTE system.

Referring to FIG. 4, the network node requests the IP address selection attribute information on a particular UE in step 401. For example, the MME which corresponds to the network node receives an allocation of IP address from at least one gateway, and when a new PDN connectivity is requested from a particular UE which has performed a PDN connection, the MME predicts that a plurality of IP addresses will be allocated to the UE and requests the IP address selection attribute information while transmitting a session creation request message to an appropriate gateway located around a particular UE.

The network node receives IP address selection attribute information and an IP address to be allocated to a particular UE from a network node that manages IP addresses allocation, in step 403. For example, the network node MME may also receive IP address selection attribute information when receiving a session request response message. The network node transmits the received IP address and IP address selection attribute information to a particular UE in step 405. For example, the network node MME may transmit the IP address selection attribute information while informing of the acceptance of the PDN connectivity through a bearer setup response message.

Thereafter, the network node terminates the procedure according to an embodiment of the present invention.

Hereinafter, on the basis of the above description, a case of a cellular interface having a plurality of IP addresses allocated thereto and a case of a WLAN interface having a plurality of IP addresses allocated thereto will be described.

First, a case where a UE is allocated a plurality of IP addresses for the cellular interface will be described with reference to FIGS. 5 and 6.

Figure 5:
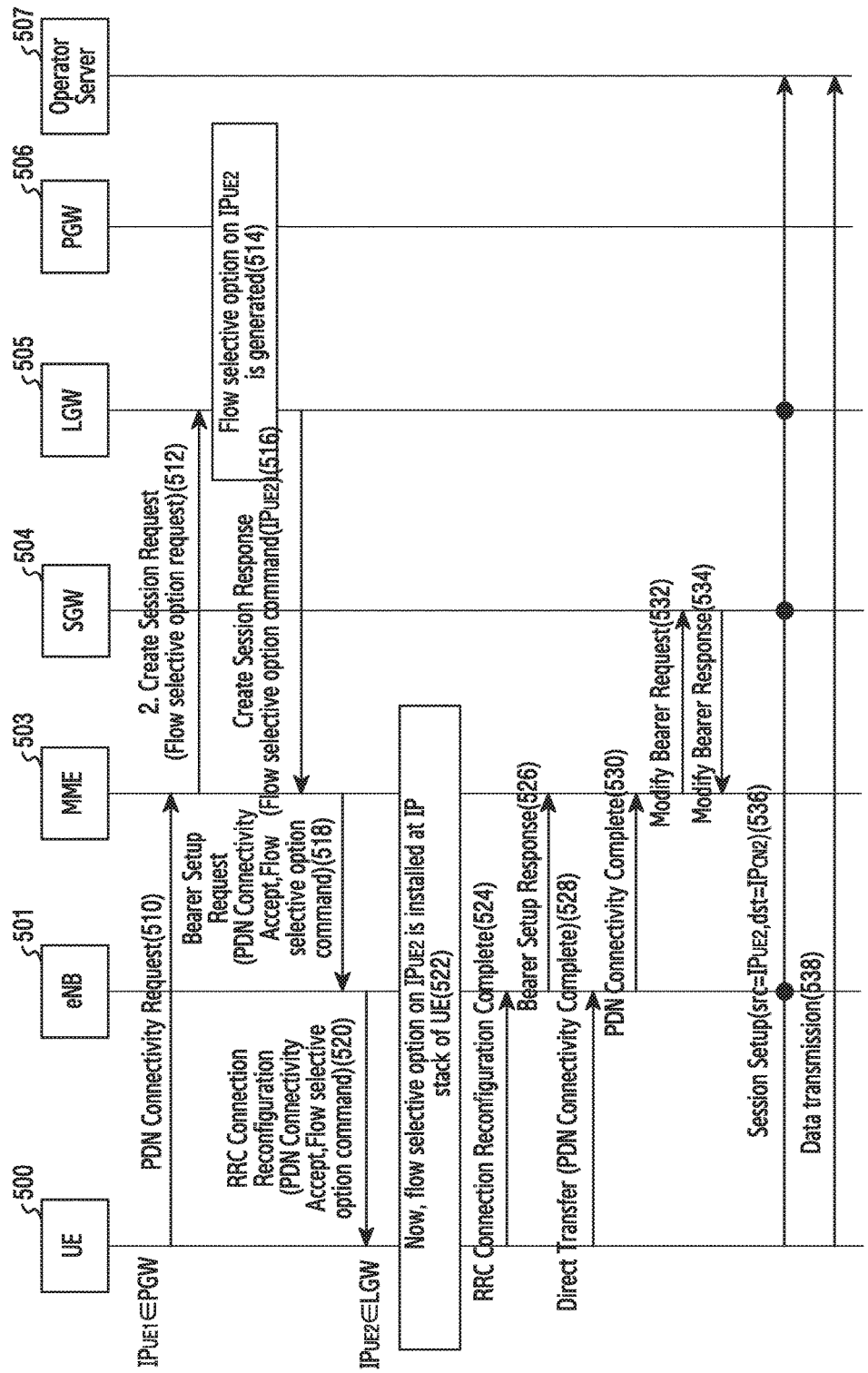
FIG. 5 is a diagram showing a signal flow of selecting an IP address so as to communicate in a cellular network system according to an embodiment of the present invention.
Figure 6:
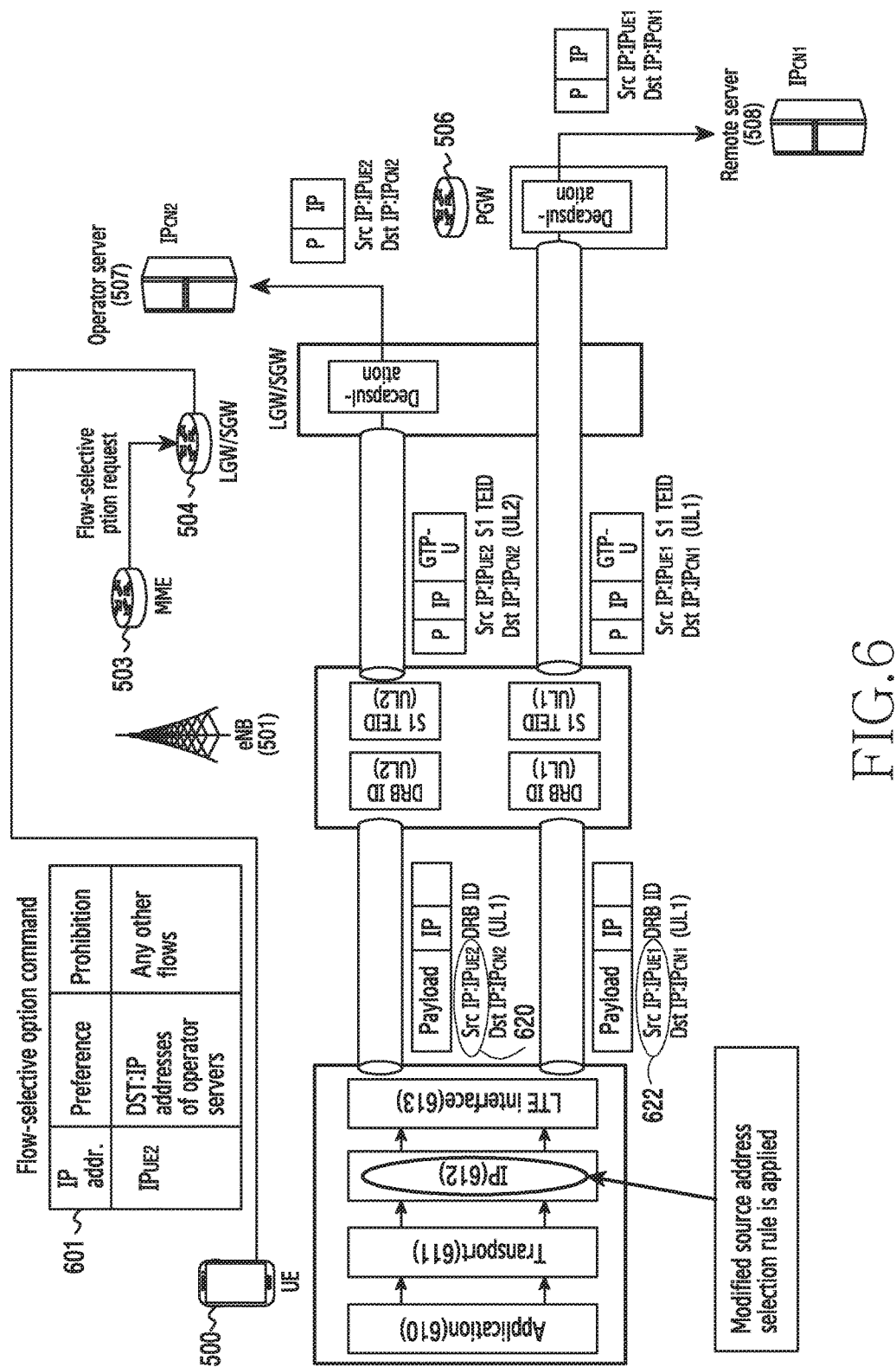
FIG. 6 is a diagram showing an example of selecting an IP address so as to communicate in a cellular network system according to an embodiment of the present invention.

FIG. 5 shows a signal flow of selecting an IP address so as to communicate in a cellular network system according to an embodiment of the present invention, and FIG. 6 shows an example of selecting an IP address so as to communicate in a cellular network system according to an embodiment of the present invention. Here, it is assumed that a UE 500 is in a state of having an IP address "$IP_{UE1}$" allocated from a PGW 506 of a macro network.

Referring to FIG. 5, the UE 500 may request for additional PDN connectivity to a MME 503 in step 510. Here, the UE may recognize that another gateway is present other than the gateway which has performed the current PDN connectivity, and request a PDN connectivity in order to use a Selective Traffic IP Offload (SIPTO). The SIPTO refers to a technology for selecting an SGW and a PGW closer to a geographical location of the UE, in order for a mobile communication carrier to provide, to the UE, a function that communicates with an external network (for example, the Internet) through a network node (for example, a gateway) close to an access network.

When receiving a PDN connectivity request from the UE 500 already allocated an IP address from the PGW 506, the MME 503 detects that a plurality of IP addresses will be allocated to the UE 500, selects an LGW 505 close to the geographic location of the UE 500, and transmits a session creation request message in step 512. According to an embodiment of the present invention, the session creation request message may include information on requesting the IP address selection attribute information. Additionally, although not shown in the drawings, when detecting that a plurality of IP addresses will be allocated, the MME 503 may request the IP address selection attribute information (or flow selection option information) from the PGW 506 which has allocated "$IP_{UE1}$" because the "$IP_{UE1}$" is already allocated to the UE 500, and acquire the IP address selection attribute information.

In step 514, the LGW 505 determines an IP address to be allocated to the UE 500 and generates IP address selection attribute information based on the operator policy, and then in step 516, the LGW 505 transmits a session creation response message including the IP address and the IP address selection attribute information to the MME 503. For example, the LGW 505 may determine an IP address to be allocated to the UE as "$IP_{UE2}$", and generate preference information and prohibition information as selection attribute information on the "$IP_{UE2}$". For example, as shown in FIG. 6, selection attribute information 601 on "$IP_{UE2}$" may indicate that a flow showing that a destination address has an IP address of the operator server is preferred, and the use of $IP_{UE2}$ by any other flows than the preferred flow is prohibited.

The MME 503 includes the received IP address and IP address selection attribute information in the bearer setup request message and transmits the same to the corresponding eNB 501 in step 518. At this time, the bearer setup request message may indicate that the PDN connectivity is accepted. The eNB 501 includes the received IP address and IP address selection attribute information in the RRC connection reconfiguration message and transmits the same to the UE 500. At this time, the RRC connection reconfiguration message may indicate that the PDN connectivity is accepted.

When receiving an allocation of "$IP_{UE2}$" from the LGW 505 in a state where "$IP_{UE1}$" is allocated from the PGW 506, the UE 500 selects the source IP address for the flow of the corresponding application based on user preference, application characteristics, and IP address selection attribute information, in step 522. According to an embodiment, as shown in FIG. 6, when the IP address selection attribute information 601 includes only the preference information and prohibition information without including coverage information, the UE 500 may omit the process of selecting the candidate IP address from an application layer 610 by using the user preference, application characteristics, and coverage information of an IP address. That is, the UE 500 may select the appropriate source address for the flow of the corresponding application from an IP layer 612 by using the information and preference information on each of the "$IP_{UE1}$" and "$IP_{UE2}$". For example, when an execution application of the UE 500 is an application which uses a server 507 of a network operator, the destination address for the flow of the application may be set to "$IP_{CN2}$" which is an IP address of the operator server 507. Accordingly, the UE 500 may select "$IP_{UE2}$" that prefers a flow where the destination address is the IP address of the operator server 507 as the source address for the flow of the application. At this time, when an execution application of the UE 500 is an application which uses the communication with a remote server 508, the destination address for the flow of the application may be set to "$IP_{CN1}$" which is an IP address of the remote server 508. Accordingly, since the UE 500 cannot use "$IP_{UE2}$" that prefers a flow where the destination address is the IP address of the operator server 507, it may select the "$IP_{UE1}$" as the source IP address for the flow of the application.

Thereafter, for the bearer reconfiguration, the UE 500 transmits the RRC connection reconfiguration message to the eNB 501 in step 524, and the eNB 501 transmits a bearer setup response message associated with the bearer formation to the MME 503 in step 526. Then, the UE 500 informs of the completion of the PDN connectivity through a direct transfer message to the eNB 501 in step 528. Then, the eNB 501 transmits the PDN connectivity complete message to MME 503 in step 530, and the MME 503 transmits a modify bearer request message to the SGW 504 in step 532. The SGW 504 transmits the modify bearer response message to the MME 503 in step 534.

Then, the UE 500 transmits a session setup message including the source IP address and destination IP address through the corresponding gateway in step 536. For example, when the source IP address is "$IP_{UE2}$" and the destination IP address is "$IP_{CN2}$", the session setup message of the UE 500 may be transmitted through the eNB 501, SGW 504, and LGW 505 to the operator server 507. When it is assumed that the source IP address is "$IP_{UE2}$" and the destination IP address is "$IP_{CN2}$", the UE 500 may set the source IP address of a data packet to the selected IP address "$IP_{UE2}$" in 620 and transmit the data packet to the operator server 507 in step 538. For another example, when it is assumed that the source IP address is "$IP_{UE1}$" and the destination IP address is "$IP_{CN1}$", the UE 500 may set the source IP address of the data packet to the selected IP address "$IP_{UE1}$" in 622 and transmit the data packet to the remote server 508 through the eNB 501, SGW 504, and PGW 506.

Hereinafter, there will be described a case where the UE is allocated a plurality of IP addresses with respect to a WLAN interface.

Figure 7:
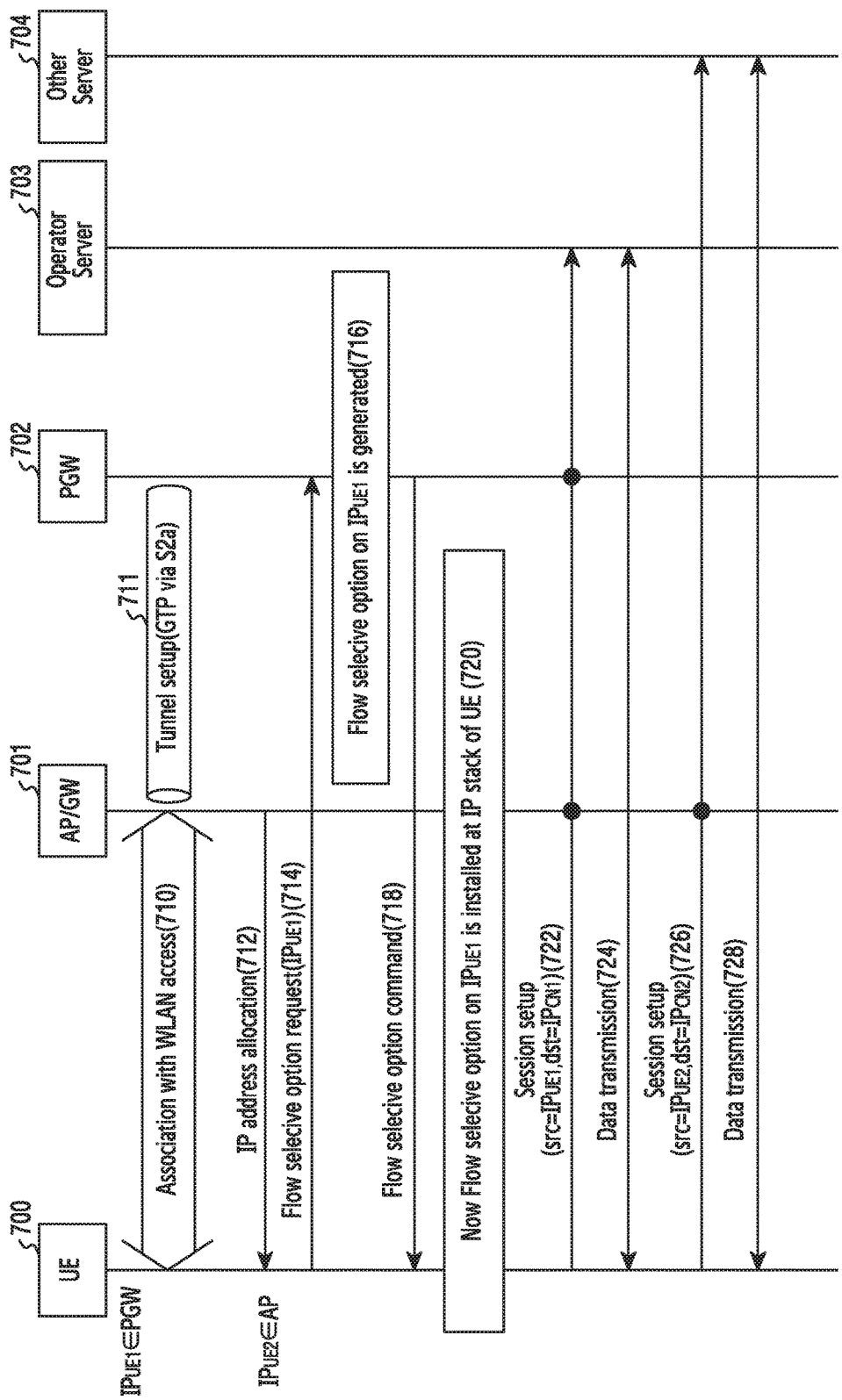
FIG. 7 is a diagram showing a signal flow of selecting an IP address so as to communicate in a system in which a cellular network and a WLAN co-exist according to another embodiment of the present invention.
Figure 8:
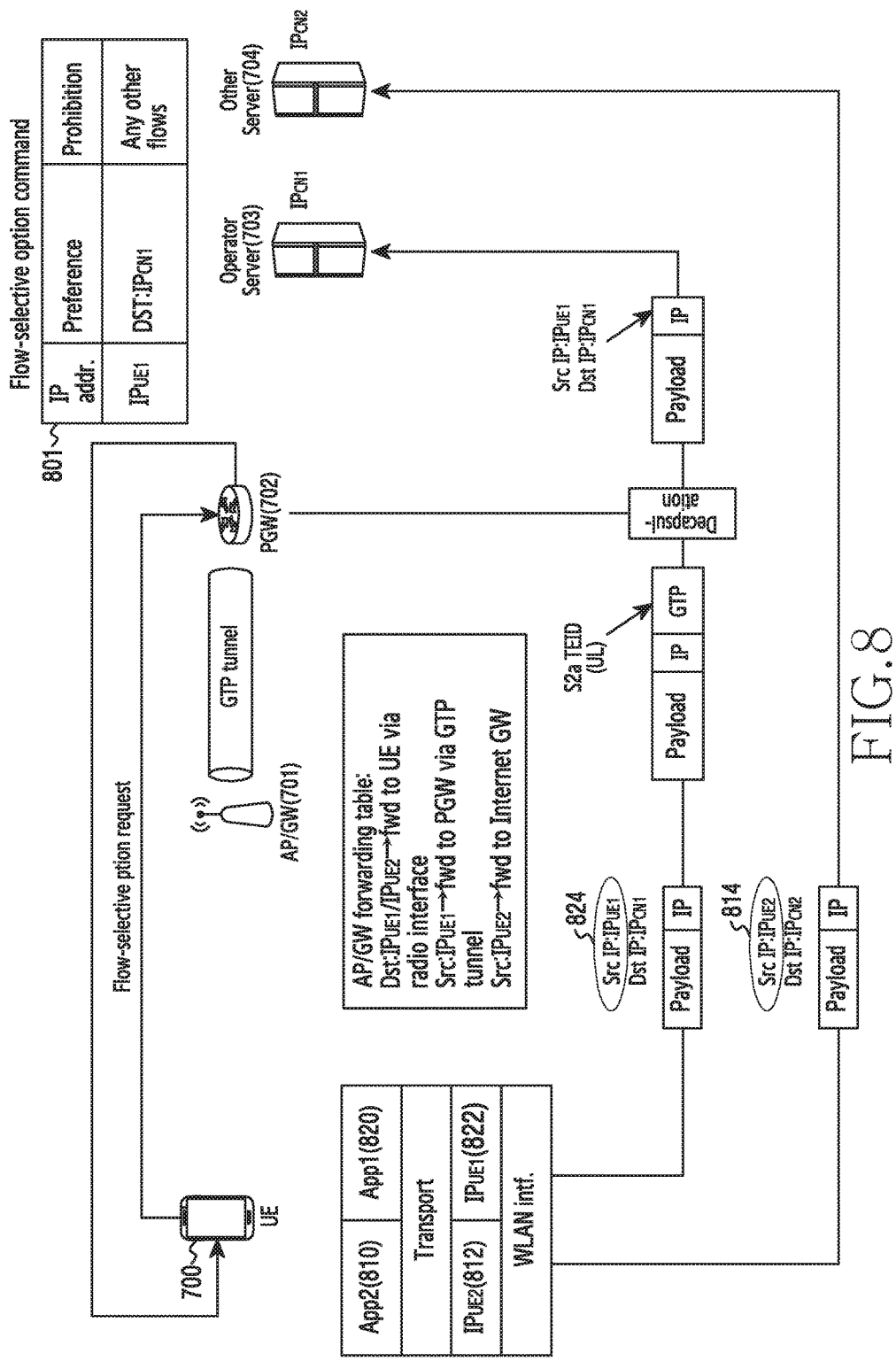
FIG. 8 is a diagram showing an example of selecting an IP address so as to communicate in a system in which a cellular network and a WLAN co-exist according to another embodiment of the present invention.

FIG. 7 shows a signal flow of selecting an IP address so as to communicate in a system where a cellular network and a WLAN co-exist according to an embodiment of the present invention, and FIG. 8 shows an example of selecting an IP address so as to communicate in a system where a cellular network and a WLAN co-exist according to another embodiment of the present invention. Here, it is assumed that a UE 700 is in a state of having an IP address "$IP_{UE1}$" allocated from the PGW 506 of the macro network for the Seamless WLAN Offload (SWO). Here, when the WLAN is connected to the UE which supports a cellular network and WLAN, since the UE disconnects the communication with the cellular and resumes the communication through the WLAN, the SWO refers to a scheme for linking the WLAN access network to the PGW so as to connect the WLAN to the Internet through the PGW, and using the IP address "$IP_{UE1}$" used by the cellular network as it is in the WLAN in order to guarantee a continuity for a service being provided through the cellular network. Additionally, in the following description, the UE 700 may be allocated an IP address "$IP_{UE2}$" from an AP 701 of the WLAN for Seamless Offload WLAN (NSWO). The NSWO refers to a scheme for, when the WLAN is connected, disconnecting the communication with the cellular system, resuming communication through the WLAN, and connecting a new session, by the UE which supports the cellular network and WLAN.

Referring to FIG. 7, the UE 700 is connected to the AP/GW 701 of the WLAN in step 710. At this time, the AP/GW 701 of the WLAN sets up a tunnel in order to be linked to the PGW in step 711, and allocates an IP address to the UE 700 in step 712. For example, the AP/GW 701 may allocate the IP address "$IP_{UE2}$" for the NSWO.

Since IP addresses are allocated from the AP/GW 701 in a state of being allocated IP addresses from the PGW 702 in advance, the UE 700 detects an allocation of the plurality of the IP addresses and requests the IP address selection attribute information from the PGW 702 in step 714. The PGW 702 generates IP address selection attribute information on the IP addresses allocated to the UE 700 in advance, in step 716, and transmits the generated IP address selection attribute information to the UE 700 in step 718. For example, the PGW 702 may generate preference information and prohibition information as the selection attribute information on the IP address "$IP_{UE1}$" allocated to the UE. For example, as shown in FIG. 8, selection attribute information 801 on the "$IP_{UE1}$" may indicate that a flow showing that the destination IP address is "$IP_{CN1}$" is preferred, and the "$IP_{UE1}$" is prohibited from being used by any other flows than the preferred flow.

The UE 700 selects a source IP address for the flow of the application based on the IP address selection attribute information, user preference, and application characteristics on the IP address allocated from the PGW 702, in step 720. According to an embodiment, as shown in FIG. 8, the UE 700 may set the source IP address for each application based on the flow information and the IP address selection attribute information of two applications "App1" and "App2". For example, when an "App1 820" is an application that requires communication with an operator server 703, and a flow of the "App1 820" has the "$IP_{CN1}$" as the destination IP address, the UE 700 may select the source IP address for the flow of the "App1 820" as "$IP_{UE1}$ 822". For another example, when an "App2 810" is an application that requires communication with other server 704, and a flow of the "App2 810" has the "$IP_{CN2}$" as the destination IP address, the UE 700 may select the source IP address for the flow of the "App2 810" as "$IP_{UE2}$ 812".

Thereafter, the UE 700 transmits, to the server (operator server 703 or other server 704), the session setup message including the source IP addresses selected in steps 722 and 726 and the destination IP address corresponding to the execution application, through the AP/GW 701. Then, the UE 700 transmits and receives data to and from a corresponding service server by using the source IP address and destination IP address in step 724 and step 726. For example, when the source IP address is "$IP_{UE1}$ 824" and the destination IP address is "$IP_{CN1}$", the session set-up message of the UE 700 may be transmitted through the AP/GW 701 and PGW 702 to the operator server 703, and then, even in a state where the WLAN is connected, the UE 700 may set the source IP address and destination IP address of the data packet of the application to "$IP_{UE}, IP_{CN1}$", so as to transmit and receive data to and from the operator server 703 through the PGW 702. For another example, when the source IP address is "$IP_{UE2}$ 814" and the destination IP address is "$IP_{CN2}$", the session set-up message of the UE 700 may be directly transmitted to the other server 704 through the AP/GW 701, and then, the UE 704 may set the source IP address and destination IP address of the data packet of the application to "$IP_{UE2}, IP_{CN2}$", so as to directly communicate with the other server 704 through the WLAN. Here, the AP/GW 701 may forward the received packet to the corresponding network node by using a table for forwarding a data packet which has the source IP address of "$IP_{UE1}$" to the PGW 702 through the GTP tunnel, or directly forwarding a data packet which has the source IP address of "$IP_{UE2}$" to the Internet gateway.

According to embodiments of the present invention described above, the UE can improve the performance experienced by the user for the service quality by selecting the source IP address to be used by the UE itself based on the user preference, application characteristics and/or the flow information and operator policy, and achieve the effect of reducing the congestion in a core network. In addition, when the UE is connected to the WLAN, it is possible to establish a new business model because the SWO or NSWO can be distinguished from each other and provided according to the application characteristics and flow information. Particularly, it will be described with reference to FIG. 9 and FIG. 10.

Figure 9:
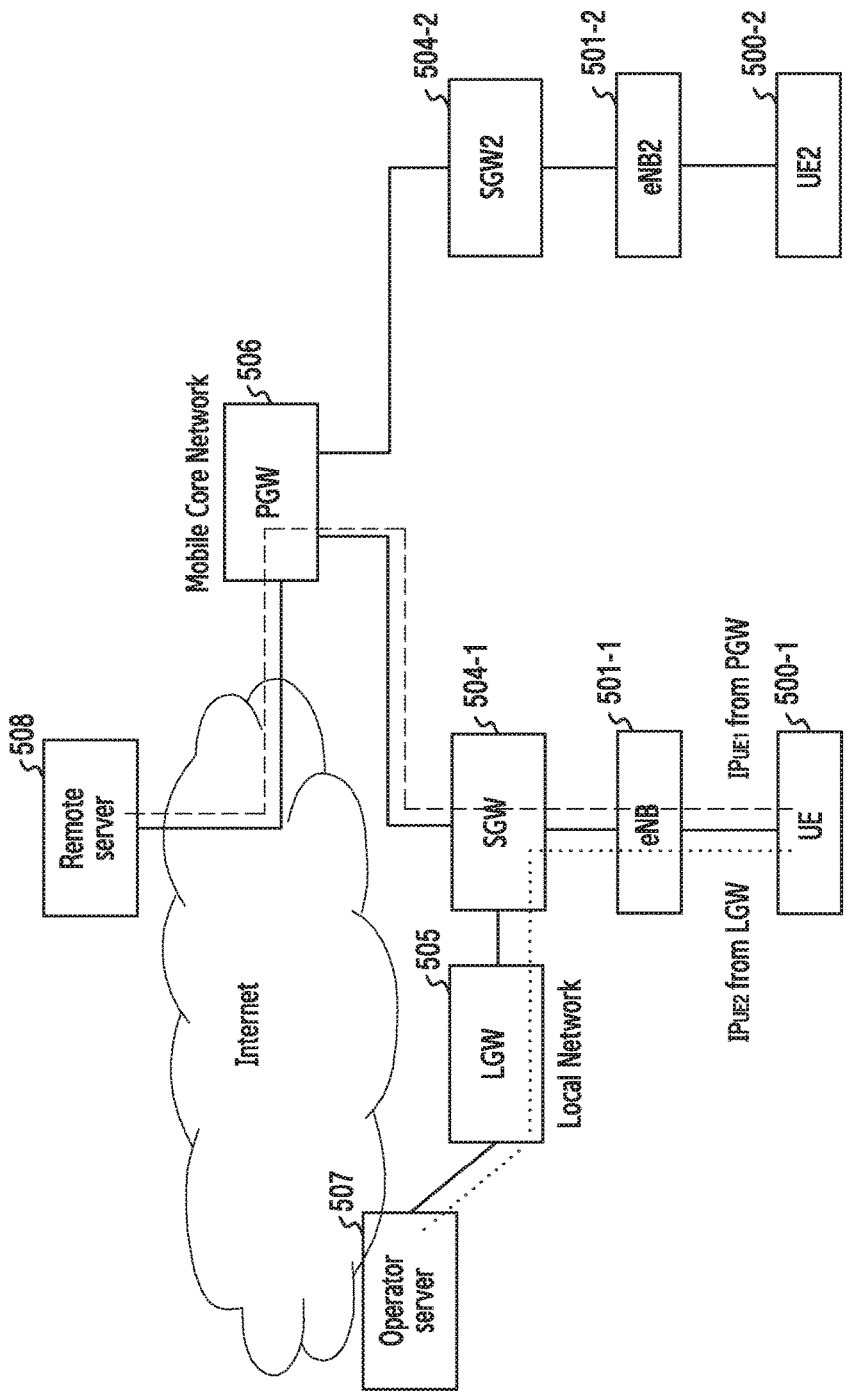
FIG. 9 is a diagram showing an example of communicating with a server corresponding to an application by using an IP address so as to communicate in a cellular network system according to an embodiment of the present invention.

FIG. 9 is a diagram showing an example of communicating with a server corresponding to an application by using an IP address so as to communicate in a cellular network system according to an embodiment of the present invention. As shown in FIG. 9, it is assumed that a case where the UE performs a PDN connectivity for the LGW 505 using an LTE interface and performs a PDN connectivity for the PGW 506. The UE 500-1 may select the IP address "$IP_{UE2}$" allocated from the LGW 505 in order to communicate with the operator server 507 so as to communicate with the operator server 507 by using a short transmission path of a local network, thereby sharing traffic of a core network while decreasing the transmission delay. At this time, in order to communicate with a remote server 508, the UE 500-1 may select an IP address "$IP_{UE1}$" allocated from the PGW 506 so as to communicate with the remote server 508 by using the path of the core network.

Figure 10:
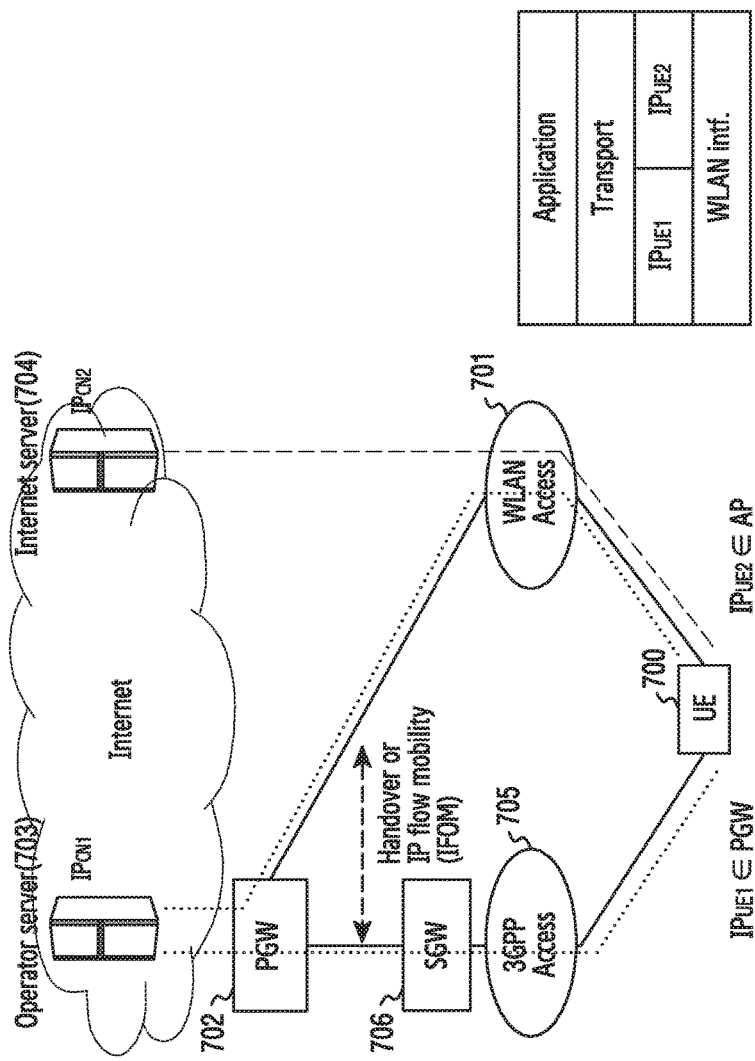
FIG. 10 is a diagram showing an example of communicating with a server corresponding to an application by using an IP address in a system in which a cellular network and a WLAN co-exist according to another embodiment of the present invention.

FIG. 10 is a diagram showing an example of communicating with a server corresponding to an application by using an IP address in a system in which a cellular network and a WLAN co-exist according to another embodiment of the present invention. As shown in FIG. 10, a case is assumed where the UE disconnects the LTE connection and connects to a WLAN through a WLAN interface in a situation where the UE has performed the PDN connectivity to the PGW 702 using the LTE interface. For example, a case is assumed where the UE is connected to the WLAN network 701 by the control of a user in a situation where the UE 700 is allocated "$IP_{UE1}$" from the PGW 702 and communicates with the operator server 703 by using the $IP_{UE1}$ for a particular application as the source IP address. At this time, the UE 700 disconnects the connection with an LTE interface, that is, a 3GPP network 705, and receives an allocation of "$IP_{UE2}$" from the AP. At this time, the UE checks whether a particular application being executed is a service which needs to provide a seamless service, and if it is determined as the service which needs to provide the seamless service, the communication of the particular application can be performed without interruption through a GTP tunnel between the WLAN network 701 and the PGW 702 by continuously maintaining the source IP address as the "$IP_{UE1}$" allocated from the PGW 702. On the other hand, when the application being executed corresponds to a service which does not need to provide a seamless service, and the UE 700 may change the source IP address to the "$IP_{UE2}$" allocated from the AP of the WLAN network 701 such that the communication of the particular application is directly performed with the corresponding server through the WLAN network 701. Similarly, the effect of sharing traffic of the core network can be obtained.

According to the present invention, when a plurality of IP addresses are allocated to the wireless communication interface of the UE, an IP address can be selected based on at least one of operator policies, user preferences, and running applications so as to improve the performance experienced by the user for the service quality and reduce the traffic intensity of an operator core network. In addition, the present invention may establish a new business model by distinguishing and providing the Seamless WLAN Offload (SWO) and the Non-Seamless WLAN Offload (NSWO) for each of the applications and/or flows.

Methods stated in claims and/or specifications according to the present invention may be implemented by hardware, software, or a combination of hardware and software.

When implemented in software, it may be provided with a computer-readable storage medium storing one or more programs (software modules). One or more programs stored in the computer-readable storage medium are configured to be executable by one or more processors in an electronic device. The one or more programs include instructions which cause the electronic device to execute methods according to the embodiments described in the claims and/or the specification of the present invention.

These programs (software modules, software) may be stored in a non-volatile memory including a random access memory and a flash memory, a Read Only Memory (ROM), Electrically Erasable Programmable Read Only Memory (EEPROM), a magnetic disc storage device. Compact Disc ROM (CD-ROM), Digital Versatile Discs (DVDs), or other forms of an optical storage device, and a magnetic cassette. On the other hand, these programs may be stored in a memory configured as a combination of some or all of them. In addition, each of the above memories may be configured of multiple pieces of memories.

In addition, the programs may be stored in an attachable storage device which can access to the electronic device through a communication network such as the Internet, Intranet, Local Area Network (LAN), Wide LAN (WLAN), or Storage Area Network (SAN), or a communication network configured as a combination thereof. These storage devices can be connected to the electronic device through an external port.

The invention claimed is:

1. A method for setting a source internet protocol (IP) address by a terminal, the method comprising:
   receiving attribute information for a plurality of IP addresses from at least one network node, the plurality of IP addresses being allocated to the terminal;
   determining at least one candidate IP address among the plurality of IP addresses based on the attribute information; and
   determining the source IP address among the at least one candidate IP address based on information regarding at least one flow for at least one application of the terminal,
   wherein the attribute information comprises information associated with a period during which the terminal is expected to stay within a service coverage of the at least one network node, and
   wherein the information associated with the period is determined based on a movement speed of the terminal.

2. The method of claim 1, wherein the determining of the source IP address among the at least one candidate IP address based on information regarding the at least one flow for the at least one application of the terminal comprises:
   determining a user preference for information on the plurality of IP addresses;
   determining the at least one candidate IP address, by the user's preference, among the plurality of IP addresses; and
   selecting the source IP address for the at least one flow of the terminal from the at least one candidate IP address based on the attribute information for the at least one candidate IP address.

3. The method of claim 1,
   wherein the attribute information for the plurality of IP addresses further comprises size information of a service coverage area of the at least one network node which allocates the corresponding IP address, and
   wherein the determining of the source IP address among the at least one candidate IP address based on the information regarding the at least one flow for the at least one application of the terminal comprises:
   predicting a use time of an application associated with the at least one flow of the terminal;
   determining the at least one candidate IP address among the plurality of IP addresses based on the predicted use time and the size information of the service coverage area included in the attribute information; and
   selecting the source IP address for the at least one flow of the terminal from the at least one candidate IP address based on the attribute information for the at least one candidate IP address.

4. The method of claim 1,
   wherein the attribute information for the plurality of IP addresses further comprises valid period information indicating a time during which the terminal is expected to stay within the service coverage of the at least one network node to which the corresponding IP address is allocated,
   wherein the valid period information is determined based on the movement speed of the terminal, and
   wherein the determining of the source IP address among the at least one candidate IP address based on the information regarding the at least one flow for the at least one application of the terminal comprises:
   predicting a use time of the at least one application associated with the at least one flow of the terminal;
   determining the at least one candidate IP address among the plurality of IP addresses based on the predicted use time and the valid period information included in the attribute information; and
   selecting the source IP address for the at least one flow of the terminal from the at least one candidate IP address based on the attribute information for the at least one candidate IP address.

5. The method of claim 1, wherein the receiving of the attribute information for the plurality of IP addresses comprises:
   requesting the attribute information, by the terminal, from the at least one network node which allocates the at least one candidate IP address; and
   receiving the attribute information for the at least one candidate IP address from the at least one network node.

6. The method of claim 1,
   wherein the receiving of the attribute information for at least one IP address among the plurality of IP addresses comprises at least one of receiving the at least one IP address and attribute information for the at least one IP address from a network node for managing the at least one IP address of the terminal or receiving changed attribute information when the attribute information is changed, and
   wherein the network node for managing the at least one IP address of the terminal comprises a node which detects a situation in which the plurality of IP addresses are allocated to the terminal.

7. The method of claim 1, wherein the information regarding the at least one flow for the at least one application of the terminal comprises at least one of a destination domain name, destination port number and a range of destination port numbers, a source port number and a range of source port numbers, a transport layer protocol, continuity of flow, or an IP address reach ability.

8. The method of claim 1, wherein the determining of the source IP address among the at least one candidate IP address based on information regarding the at least one flow for the at least one application of the terminal comprises selecting the source IP address by considering at least one of a user preference information or characteristics information of an application.

9. A method for allocating an internet protocol (IP) address by a network node, the method comprising:
   generating attribute information for a plurality of IP addresses; and
   transmitting the attribute information for the plurality of IP addresses to a terminal, the plurality of IP addresses being allocated to the terminal,
   wherein the attribute information is used for determining at least one candidate IP address among the plurality of IP addresses,
   wherein a source IP address is determined among the at least one candidate IP address based on information regarding at least one flow for at least one application of the terminal, wherein the attribute information comprises information associated with a period during which the terminal is expected to stay within a service coverage of the network node, and wherein the information associated with the period is determined based on a movement speed of the terminal.

10. The method of claim 9, wherein the attribute information for the at least one candidate IP address further comprises size information of a service coverage area of the network node.

11. The method of claim 9, wherein the information regarding the at least one flow for the at least one application of the terminal comprises at least one of a destination domain name, destination port number and a range of destination port numbers, a source port number and a range of source port numbers, a transport layer protocol, continuity of flow, or an IP address reach ability.

12. A terminal for setting a source internet protocol (IP) address, the terminal comprising:
a transceiver; and
at least one processor operatively coupled to the transceiver,
wherein the at least one processor is configured to:
receive attribute information for a plurality of IP addresses from at least one network node, the plurality of IP addresses being allocated to the terminal,
determine at least one candidate IP address among the plurality of IP addresses based the on attribute information, and
determine the source IP address among the at least one candidate IP address based on information regarding at least one flow for at least one application of the terminal, and
wherein the attribute information comprises information associated with a period during which the terminal is expected to stay within a service coverage of the at least one network node, and
wherein the information associated with the period is determined based on a movement speed of the terminal.

13. The terminal of claim 12, wherein the at least one processor is further configured to:
determine a user preference for information on the plurality of IP addresses,
determine the at least one candidate IP address, by a user preference, among the plurality of IP addresses, and
select the source IP address for the at least one flow of the terminal from the at least one candidate IP address based on the attribute information for the at least one candidate IP address.

14. The terminal of claim 12,
wherein the attribute information for the plurality of IP addresses further comprises size information of a service coverage area of the at least one network node which allocates the corresponding IP address, and
wherein the at least one processor is further configured to:
predict a use time of an application associated with the at least one flow of the terminal,
determine the at least one candidate IP address among the plurality of IP addresses based on the predicted use time and the size information of the service coverage area included in the attribute information, and
select the source IP address for the at least one flow of the terminal from the at least one candidate IP address based on the attribute information for the at least one candidate IP address.

15. The terminal of claim 12,
wherein the attribute information for the plurality of IP addresses further comprises valid period information indicating a time during which the terminal is expected to stay within the service coverage of the at least one network node to which the corresponding IP address is allocated,
wherein the valid period information is determined based on the movement speed of the terminal, and
wherein the at least one processor is further configured to:
predict a use time of the at least one application associated with the at least one flow of the terminal,
determine the at least one candidate IP address among the plurality of IP addresses based on the predicted use time and the valid period information included in the attribute information, and
select the source IP address for the at least one flow of the terminal from the at least one candidate IP address based on the attribute information for the at least one candidate IP address.

16. The terminal of claim 12, wherein the at least one processor is further configured to:
request the attribute information, by the terminal, from the at least one network node which allocates the at least one candidate IP address, and
receive the attribute information for the at least one candidate IP address from the at least one network node.

17. The terminal of claim 12,
wherein the at least one processor is further configured to:
receive the at least one candidate IP address and attribute information for the at least one candidate IP address from a network node for managing the at least one candidate IP address of the terminal, or
receive changed attribute information when the attribute information is changed, and
wherein the network node for managing the at least one candidate IP address of the terminal comprises a node which detects a situation in which the plurality of IP addresses are allocated to the terminal.

18. The terminal of claim 12, wherein the information regarding the at least one flow for the at least one application of the terminal comprises at least one of a destination domain name, destination port number and a range of destination port numbers, a source port number and a range of source port numbers, a transport layer protocol, continuity of flow, or an IP address reach ability.

19. The terminal of claim 12, wherein the at least one processor is further configured to select the source IP address by considering at least one of a user preference information or characteristics information of an application.

* * * * *